United States Patent
Halder et al.

(10) Patent No.: US 10,908,895 B2
(45) Date of Patent: Feb. 2, 2021

(54) STATE-PRESERVING UPGRADE OF AN INTELLIGENT SERVER ADAPTER

(71) Applicant: Pensando Systems Inc., San Jose, CA (US)

(72) Inventors: Barun Amalkumar Halder, San Jose, CA (US); Alok Rathore, Milpitas, CA (US); Neel Patel, San Jose, CA (US); James Bradley Smith, San Jose, CA (US); David Antony Clear, San Jose, CA (US)

(73) Assignee: PENSANDO SYSTEMS INC., San Jose, CA (US)

(*) Notice: Subject to any disclaimer, the term of this patent is extended or adjusted under 35 U.S.C. 154(b) by 0 days.

(21) Appl. No.: 16/230,550

(22) Filed: Dec. 21, 2018

(65) Prior Publication Data
US 2020/0201624 A1    Jun. 25, 2020

(51) Int. Cl.
*G06F 8/656*    (2018.01)
*G06F 11/14*    (2006.01)
*H04L 29/08*    (2006.01)

(52) U.S. Cl.
CPC .......... *G06F 8/656* (2018.02); *G06F 11/1433* (2013.01); *G06F 11/1438* (2013.01);
(Continued)

(58) Field of Classification Search
CPC .. G06F 8/656; G06F 11/1456; G06F 11/1464; G06F 11/1433; G06F 11/1466;
(Continued)

(56) References Cited

U.S. PATENT DOCUMENTS 5,761,518 A * 6/1998 Boehling ............ G05B 19/0421
                                                            700/82
8,069,293 B1    11/2011 Rogan et al.
(Continued)

FOREIGN PATENT DOCUMENTS

CN        102222010 A  * 10/2011
CN        105700967 A  *  6/2016
WO    WO-2020132413 A1     6/2020

OTHER PUBLICATIONS

Weppenaar et al., "Intelligent Maintenance Management in a Reconfigurable Manufacturing Environment Using Multi-Agent Systems", Jul. 2010, Central University of Technology (Year: 2010).*
(Continued)

*Primary Examiner* — Wei Y Zhen
*Assistant Examiner* — Junchun Wu
(74) *Attorney, Agent, or Firm* — Wilson Sonsini Goodrich & Rosati

(57) ABSTRACT

Methods and systems for upgrading an intelligent server adapter (ISA) with reduced downtime that affects performance are provided. The method includes, from a main agent, initiating a backup agent that includes critical functions of the ISA and runs in a tight loop, isolated from other components. The main agent transfers critical duties to the backup agent and shuts down before performing the upgrade. After upgrading itself and other system components, the main agent retrieves the duties from the backup agent, and may terminate the backup agent.

20 Claims, 4 Drawing Sheets

(52) U.S. Cl.
CPC ...... *G06F 11/1451* (2013.01); *G06F 11/1456* (2013.01); *G06F 11/1464* (2013.01); *G06F 11/1466* (2013.01); *H04L 67/34* (2013.01)

(58) Field of Classification Search
CPC ... G06F 11/1451; G06F 11/1438; H04L 67/34
See application file for complete search history.

(56) References Cited

U.S. PATENT DOCUMENTS

| | | | |
|---|---|---|---|
| 8,307,095 B2 | 11/2012 | Clark et al. | |
| 8,418,166 B2* | 4/2013 | Armstrong | G06F 9/4411 717/168 |
| 8,695,075 B2* | 4/2014 | Anderson | G06F 9/45533 726/8 |
| 8,745,205 B2* | 6/2014 | Anderson | G06F 9/455 709/224 |
| 9,239,840 B1* | 1/2016 | Acharya | G06F 16/164 |
| 9,830,143 B2 | 11/2017 | Chigurapati et al. | |
| 9,843,624 B1* | 12/2017 | Taaghol | H04L 41/0803 |
| 9,967,144 B2* | 5/2018 | Kumarasamy | H04L 67/34 |
| 9,996,338 B2 | 6/2018 | Dujmovic et al. | |
| 2003/0149608 A1* | 8/2003 | Kall | G06Q 10/06 705/7.27 |
| 2007/0192863 A1* | 8/2007 | Kapoor | H04L 67/10 726/23 |
| 2008/0120498 A1* | 5/2008 | Peterson | G06F 1/26 713/2 |
| 2012/0054730 A1* | 3/2012 | Michishita | G06F 8/654 717/169 |
| 2012/0096250 A1* | 4/2012 | Aloni | G06F 8/656 713/2 |
| 2012/0150805 A1* | 6/2012 | Pafumi | G06F 11/1415 707/640 |
| 2014/0258999 A1* | 9/2014 | Katihar | G06F 8/65 717/168 |
| 2014/0289331 A1* | 9/2014 | Chan | G06F 16/113 709/204 |
| 2017/0242686 A1* | 8/2017 | Vidyadhara | G06F 8/656 |
| 2017/0344703 A1* | 11/2017 | Ansari | H04M 15/73 |
| 2018/0074837 A1* | 3/2018 | Zhang | G06F 8/65 |
| 2018/0152540 A1 | 5/2018 | Niell et al. | |
| 2018/0356989 A1 | 12/2018 | Meister et al. | |

OTHER PUBLICATIONS

Zellweger et al., "Decoupling Cores, Kernels, and Operating Systems", Oct. 2014, USENIX (Year: 2014).*
Saghir et al., "Datapath and ISA Customization for Soft VLIW Processors", 2006, IEEE (Year: 2006).*
Agilio Software, "Agilio® OVS Software Architecture", 2016, Netronome Systems (Year: 2016).*
PCT/US2019/067791 International Search Report and Written Opinion dated Apr. 28, 2020.
PCT/US2019/067791 Invitation to Pay Additional Fees dated Feb. 21, 2020.

* cited by examiner

STATE-PRESERVING UPGRADE OF AN INTELLIGENT SERVER ADAPTER

BACKGROUND OF THE INVENTION

Computing environments may include hosts such as servers, computers running one or more processes, such as virtual machines or containers. The hosts and/or processes may be configured to communicate with other processes or devices over a computing network. The host systems interface with the computing network via input/output (IO) devices (e.g., network interface cards (NICs) or intelligent server adapters (ISAs)). An increase in the complexity of networks and the protocols which run on them has caused an increase in the networking operations to be performed by the host computing systems. This may be exacerbated by increased network bandwidth requiring more of the host processing time. Intelligent server adapters (ISAs) are increasingly deployed in datacenters to offload complex networking tasks from host computing systems such as host servers, thus freeing up processing resources for applications on the host computing systems.

ISAs may save large amounts of state information within them in order to provide advanced services. In some cases, the ISAs may interface with the host as Peripheral Component Interconnect Express® (PCIe) devices. The advanced functions can be host-agnostic, and hosts usually use off-the-rack drivers to communicate with these PCIe devices or ISA devices. ISA devices are usually managed separately from the hosts by administrators who are not necessarily the same as the host administrators. The management of ISA devices may include device upgrades which are important for providing more features, fixings security bugs and the like.

SUMMARY OF THE INVENTION

Currently, upgrades are performed by bringing the host down or bringing the host link down, thus affecting the availability of the host. Moreover, upgrading ISAs may require a system reboot, which can cause a loss of stored state information. Upgrading of such ISAs can be difficult because of the large amounts of state information they have and insufficient support from the host side. This problem can be complicated by low timeouts for PCIe transactions, low downtime requirements and high frequency of I/O operations. For example, PCIe has a Completion Timeout (CTO) for Non-Posted transactions (e.g., MWr or MRd) which has a typical time of 50 milliseconds. On a longer downtime during upgrade, the PCIe Host Bus Adapter (HBA) may report a Non-Fatal Completion Timeout (CTO) error that can result in a software Non-Maskable Interrupt (NMI) that reboots the host system (e.g., server). Moreover, independent components of the system such as drivers, operating systems, or applications which are unaware of the upgrade may also experience interruption or disruption of a running service due to the ISA upgrade.

There is a need to provide a method of upgrading intelligent server adapters (ISAs) that does not cause interruption or does not require a reboot of either the host server or the ISA. The present invention addresses this need and provides related advantages as well.

In an aspect, a method for upgrading an intelligent server adapter (ISA) is provided. The method may comprise: receiving an upgrade request at a main agent of the ISA, wherein the main agent includes a first set of executable instructions that are implemented by a first processor core; in response to receiving the upgrade request, initiating a backup agent, which backup agent includes a second set of instructions executable by a second processor core; transferring state information to the backup agent and disconnecting the second processor core; and performing an upgrade of one or more components of the ISA.

In some embodiments, the main agent is within a kernel of the intelligent server adapter. In some embodiments, the second processor core is not connected to the kernel. In some embodiments, the intelligent server adapter is a PCIe device. In some embodiments, transferring the state information to the backup agent comprises performing a handshake.

In some embodiments, the method further comprises terminating the backup agent upon completion of the upgrade. In some cases, upon completion of the upgrade the method further comprises reclaiming the second processor core.

In some embodiments, the main agent includes a Linux process. Alternatively, the main agent is a module of the kernel. In some embodiments, the second set of instructions includes one or more critical functions performed by the main agent. In some cases, the method further comprises retrieving the critical functions from the backup agent upon completion of the upgrade.

In another aspect, an intelligent server adapter communicatively coupled to a host computing system is provided. The intelligent server adapter comprises: a main agent configured to: (i) process requests from the host computing system; (ii) perform a set of communication functionalities; and (iii) initiate a backup agent during an upgrade process of the intelligent server adapter; and the backup agent including instructions executable by a processor core that is not connected to the kernel of the intelligent server adapter, wherein the instructions include a subset of the communication functionalities performed by the main agent.

In some embodiments, the subset of the communication functionalities is retrieved from the backup agent back to the main agent upon completion of the upgrade process. In some embodiments, the main agent is within the kernel of the intelligent server adapter. In some embodiments, the intelligent server adapter is a PCIe device. In some embodiments, the main agent is further configured to transfer state information to the backup agent. In some embodiments, the backup agent is terminated upon completion of the upgrade. In some embodiments, the processor core is reclaimed by the intelligent server adapter upon completion of the upgrade process. In some embodiments, the main agent includes a Linux process. In some embodiments, the main agent is a module of the kernel.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
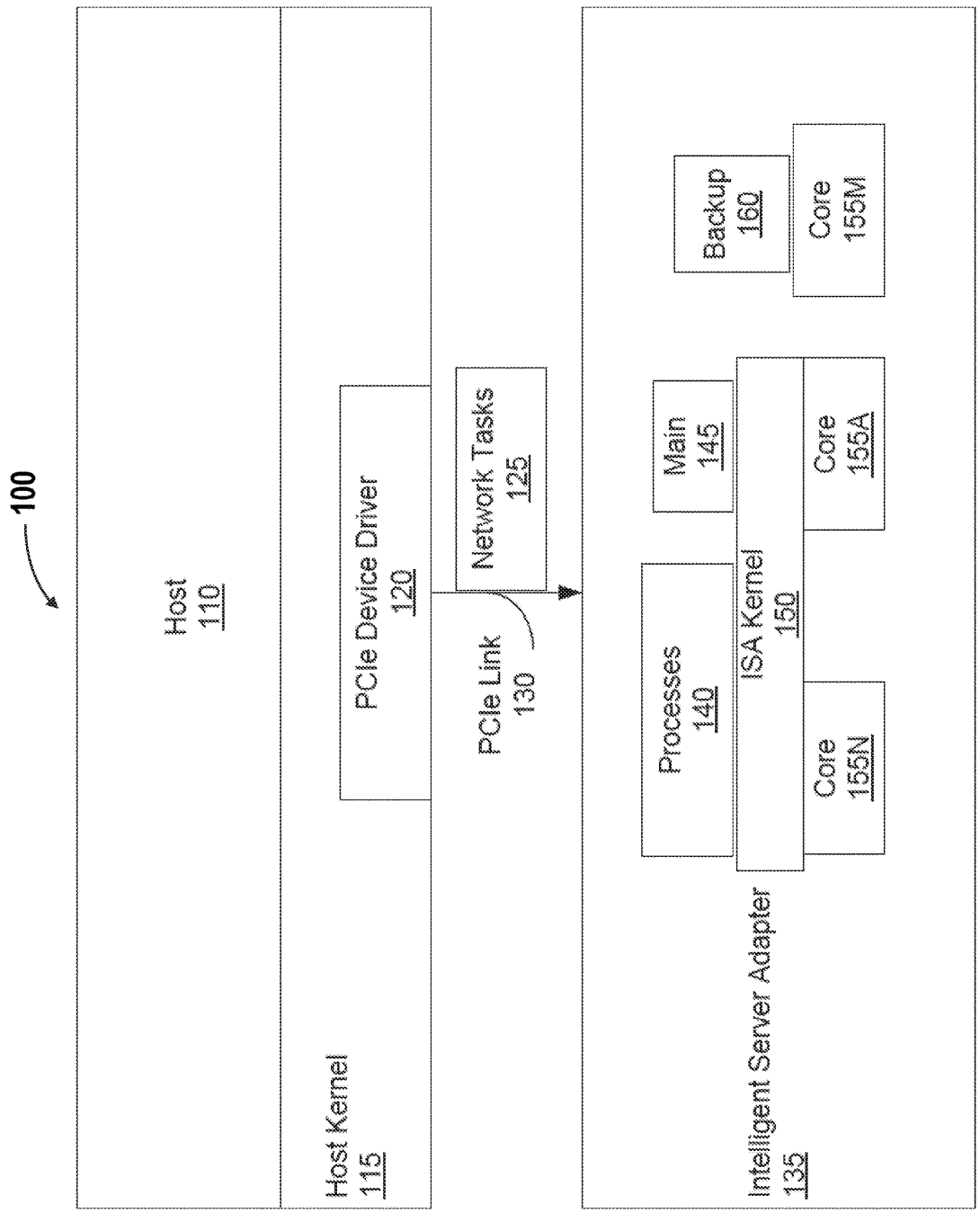
FIG. 1 schematically shows a diagram of an example host-based networking system.

Systems and methods of the present disclosure allow for upgrading an intelligent server adapter (ISA) in a non-disruptive manner. In some cases, the ISA may also be referred to as a Smart Network Interface Card (SmartNIC). The ISA may be a device that communicates with a host server using PCI Express (PCIe) and acts as an input/output (I/O) device interfacing with the host server's kernel through a device driver. ISAs may comprise a class of NICs that not only include circuitry to allow computers to connect to networks, but also include advanced networking functionality. These capabilities allow host servers to offload networking tasks to ISAs, allowing the host servers to use computing resources for other tasks, such as running additional virtual machines.

The provided ISA may be interfacing with any operating-system-level virtualization (e.g., container and Docker system) or machine level virtualization or computing system without virtualization features. A container is a lightweight, virtualized, portable, software-defined environment in which software can run in isolation of other software running on the physical host machine. OS kernel allows the existence of multiple isolated containers in operating-system-level virtualization. These containers are "lightweight" images of a machine configuration, which may provide a "recipe" or workflow for how a machine is built.

The ISA may include one or more processor cores in order to implement networking functions based on requests made by the host server. It may also include memory to store the instructions and results from executing the instructions. The ISA may include a kernel that manages memory and allocates usage of computing resources to processes. The kernel may also manage one or more peripheral devices that may be connected to the ISA.

In some embodiments, the provided methods or systems may include first receiving an upgrade request at a main agent communicatively coupled to a first processor core. The main agent may be a computer program executing on the ISA that handles the ISA's configuration space and transactions from the host server. The host server, through the main agent, may request the ISA to perform networking functions, such as metering, collecting statistics, and employing one or more match-action tables to process packets based on their identifying information. The main agent may route requests from the host server to processes on the ISA which carry out these instructions. During an upgrade, the main agent and the processes implementing network functions are upgraded. The main agent may be controlled by the ISA's kernel or may be implemented within the ISA's kernel. The main agent may be a Linux process, or a module within the ISA's kernel.

In some cases, upon receiving the upgrade request, the ISA's main agent may initiate a backup agent communicatively coupled to a second processor core. For example, the main agent may initiate a communication link with the backup agent, for example, by initiating a handshake with the backup agent. The processes implemented by the backup agent may be processes that are maintained in order to satisfy PCI timeliness guarantees. Cessation of these processes may lead to catastrophic failure, and would normally require a reboot of the main agent. This would lead to disruption of service. The backup agent may enable the processes to continue while the upgrade takes place.

The backup agent may be a simple version of the main agent. The backup agent may be a process (e.g., a Linux process) that may implement one or more critical functions of the ISA. In some cases, the backup agent may be implemented as a process which may include a (minimal) set of functionalities of kernel and the critical functions of the main agent. For example, the backup agent may handle a subset of the PCIe protocol that includes only critical functions and a failure of such functionalities may cause host system reboot. The backup agent may be a self-contained process that may not require the ISA's kernel in order to function. The backup agent may not be within the ISA's kernel. In some cases, the backup agent may use a second processor core. The backup agent may be implemented in a tight loop, not sharing processing resources with other agents' programs.

During the upgrade process, the main agent may transfer one or more critical duties and/or state information to the backup agent. In some cases, the main agent may then shut down and disconnect the second core that is used by the backup agent. In some cases, the second core may be hot unplugged or disconnected without first shutting it down. The disconnect may be performed so that the host agent may not use the second core.

The ISA may be restarted and an upgrade may be performed on the ISA's components, including the main agent and additional programs implementing network functions. When the upgrade is completed, the ISA may reclaim the second core. The main agent receives control of the critical duties from the backup agent.

The ISA may comprise a control plane and a data plane. Both the control plane and the data plane may comprise services offloaded from the host server. The control plane may have management and control applications. The data plane may have logic for forwarding data. For example, the control plane provides switching instructions for data packets within the network, while the data plane executes the switching instructions.

The main agent and the backup agent may communicate using a handshaking process. In some cases, following completion of the upgrade, the backup agent may be terminated.

The provided methods and systems may allow the ISA to undergo a reduced amount of downtime during ISA upgrade. For example, the downtime may not exceed 100 milliseconds, 90 milliseconds, 80 milliseconds, 70 milliseconds, 60 milliseconds, 50 milliseconds, 40 milliseconds, 30 milliseconds, 20 milliseconds, 10 milliseconds or less.

FIG. 1 schematically shows a diagram of an example host-based networking system. The host computing system 110 may interface an intelligent server adapter 135. In some cases, the host computing system 110 or the base system logic may comprise a bare metal server, a hypervisor or a docker base for controlling one or more virtual machines or containers. The host computing system 110 may include a physical host which may be a computing device that acts as computing server such as a blade server or bare-metal server. In some cases, a physical host may be part of a cloud computing environment. By way of further non-limiting examples, a physical host can host different combinations and permutations of virtual and container environments. In some embodiments, the intelligent server adapter may be a PCIe device. The intelligent server adapter may be communicatively coupled to the host computing system 110 by a PCIe link 130.

The host computing system 110 may be a network-connected computing system. The host computing system 110 may be controlled by a kernel 115. For example, the host computing system 110 may use a MICROSOFT, UNIX, or LINUX operating system, of which the kernel 115 is the core. The kernel 115 may interface with I/O devices using device drivers, such as the PCIe device driver 120. The host computing system 110 may include data storage, data access, program logic, and presentation logic capabilities. The host computing system 110 may include one or more computing devices, such as desktop computers, mainframe computers, microcomputers, tablet computers, smartphones, or other computing devices. The host computing system 110 may be a server farm. The host computing system 110 may include one or more virtual machines as well as a hypervisor to run the virtual machines as described elsewhere herein. The host computing system 110 may also include a virtual switch to allow the server to connect to additional network devices and exchange data. The virtual machines may include virtual network interface cards to connect the virtual machines to the network, and data plane libraries to expedite packet processing.

The host kernel 115 may provide resource management, memory management, and input/output (I/O) device management to the host computing system. For example, the host kernel 115 may allocate processing power to one or more processes initiated by a virtual machine running on the host computing system. The host kernel 115 may store process instructions and data in memory, and allows programs installed within memory to access data and respond to instructions. The host kernel 115 may control one or more I/O devices, such as the ISA 135, through one or more device drivers.

The host kernel 115 is the core of the host operating system and may mediate access to host resources. The host kernel 115 may include a processor, memory, and may interface with I/O devices. The kernel allows process to access memory. The host kernel 115 may control peripheral I/O devices using device drivers.

The PCIe device driver 120 may allow the ISA 135 to interact with the host server 110. In some cases, the PCIe device driver 120 may be controlled by the host kernel 115. The PCIe device driver 120 may communicate with the host computing system 110 using a serial bus to exchange data.

In some cases, the PCIe device driver may establish a PCIe link 130, which is used by the host computing system 110 to issue requests and offload network tasks 125 to the intelligent server adapter 135.

The network tasks 125 may include services that are offloaded to the ISA 135 by the host computing system. The host computing system may offload the network tasks 125 to the ISA 135 in order to make computing resources available for other tasks, improving the performance of the host computing system 110. The network tasks 125 may include traditional network interface card (NIC) tasks, such as receiving and transmitting data, performing checksums, performing large send offload (LSO), and performing receive-side scaling (RSS). They may also include tunneling offload tasks, load balancing, metering, collecting network statistics and various others.

The intelligent server adapter (ISA) 135 may perform the networking functions offloaded by the host server. The ISA 135 may connect to the host server using a serial bus, such as a PCIe connection. The ISA 135 may be a computing device implemented using a Field Programmable Gate Array (FPGA), an application-specific integrated circuit (ASIC), as a system-on chip (SOC) or other hardware components. The ISA 135 may have one or more network interface connections, including one or more Ethernet connections. The ISA 135 may have a microprocessor with one or more cores, memory. The ISA may be manufactured to interface with many types of Ethernet standards. The ISA 135 may run one or more virtual machines to perform networking tasks, and control the virtual machines using a hypervisor.

The ISA 135 may use a control plane and a data plane to transmit data packets. The control plane may provide routing instructions for incoming packets of information and stores the instructions in a data table. The control plane may be stored in memory on a chip, for example, in an SoC ISA. The data table may be updated manually or update dynamically in response to new routing instructions. The data plane may route the packets to their destinations on the network, based on information from the data table. The data plane may or may not be programmable. The control plane and data plane features on the ISA 135 may contain duplicate features of control plane and data plane components on the host computing system. Alternatively, the host computing system 110 may retain the data plane, the control plane, or both.

The ISA kernel 150 manages the networking functions of the ISA 135. The ISA kernel 150 may allocate the offloaded functions of the ISA 135 to one or more processor cores 155A-N. The ISA kernel 150 may also allocate memory to processes executed by programs implementing the offloaded functions. In some cases, the ISA kernel 150 may be associated with an operating system, such as Red Hat Enterprise Linux or Ubuntu.

The ISA may have a single-core or multicore processor. A multicore processor may contain one or more cores 155A-N communicatively coupled to the ISA kernel 150. The ISA kernel 150 may execute programs implementing one or more of the offloaded functions of the ISA 135 using one or more of the processor cores. One or more processor cores 155A-N may not be communicatively coupled to the ISA kernel 150. These cores may include microkernels, which perform subsets of basic kernel functions. The processor cores may be highly multithreaded, with individual cores executing many processes concurrently. Multithreading the processor cores may produce a large processor gain, which may expedite data plane processing in the host-based networking.

The main agent 145 may implement one or more functions using software and may allow the ISA 135 to perform networking functions without the host server's (i.e., host computing system) direct involvement. The main agent 145 may perform transactions originating from the host server 110 and may handle the configuration space for the ISA 135. The main agent 145 may implement one or more functions offloaded from the host server 110, and direct data from the host server 110 to one or more processes running on the ISA 135. The main agent may also configure the ISA 135. For example, the main agent 145 may include a set of instructions within the configuration space defining how software programs interact with and control functions of the ISA 135. The main agent 145 may be implemented as processes that communicate with the kernel. The main agent 145 may be a module within the kernel 150. The main agent may be implemented by software, hardware or a combination of both.

The backup agent 160 can be an additional software component that is initiated by the main agent 145 and may run while the main agent 145 is powered down. The backup agent 160 may exist in order to implement critical functions while the main agent 145 is upgraded, and thus reduce downtime. The backup agent may not be controlled by the ISA 135. The backup agent 160 may be a software process that includes basic kernel functionality or a subset of kernel functionality as described above. The backup agent 160 may include a micro-kernel to implement the basic functionality. The backup agent 160 provides instructions to be executed by a core 155M, which is not coupled to the ISA kernel 150. The computing source such as the core 155M may be dynamically assigned to the backup agent. For example, the main agent 145 or the ISA may reclaim the core 155M used by the backup agent 160 in order to obtain additional processing power for implementing the one or more processes 140. In some cases, the main agent 145 may be capable of selecting one or more functions to be performed by the backup agent.

Figure 2:
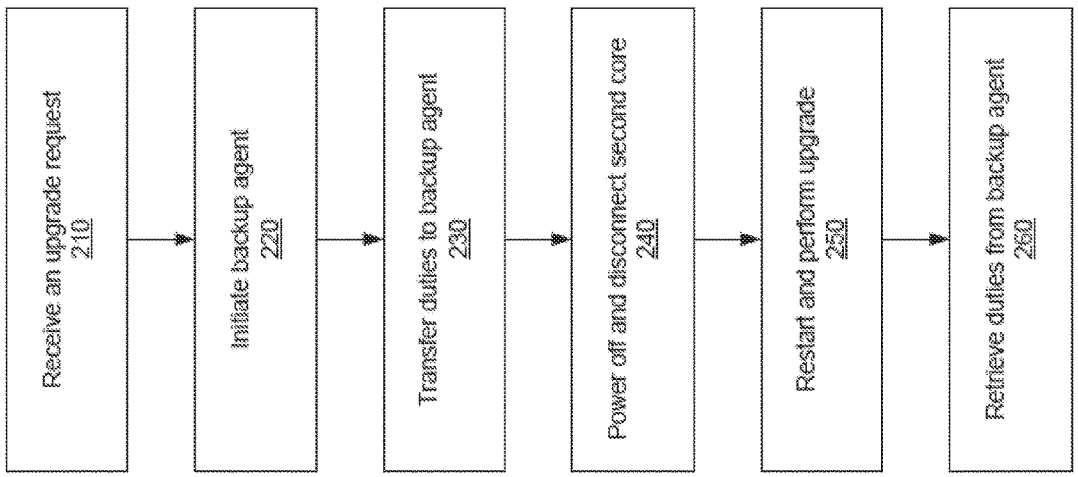
FIG. 2 shows a process diagram of an example method for upgrading an intelligent server adapter (ISA)

FIG. 2 illustrates a process 200 for upgrading an ISA. The main agent 145 on the ISA 135 may receive an upgrade request (operation 210). The upgrade request may originate from the host computing system 110 or another connected computing device. In some cases, the ISA 135 may download an upgrade package from the host computing system 110 or over a network. The main agent 145 of the ISA 135 may then initiate a backup agent (operation 220). The main agent 145 may use one or more cores 155A-N controlled by the ISA kernel 150 to execute instructions from programs stored in memory, such as processes 140 that implement network functions. The backup agent 160 may comprise critical functions and may execute the critical functions with a processor core 155M that is not controlled by the ISA kernel 150. Prior to upgrading, the main agent 145 may transfer one or more duties to the backup agent 160 (operation 230). The one or more duties may be the critical functionalities pre-stored with the backup agent. The one or more duties may include state information (e.g., queue state, hardware state, flow state, etc). In some cases, the main agent 145 may transfer state information to the backup agent 160 using a handshake protocol. The main agent 145 may transfer critical duties to the backup agent in order to prevent a forced reboot of the main agent 145.

In some cases, the backup agent 160 may run in a tight loop, and may be barred from interacting with one or more components of the ISA 135. The main agent 145 may be powered off, while the backup agent 160 remains running. The core 155M used by the backup agent 160 may be disconnected (operation 240), in order to prevent the main agent 145 from using it when it is restarted. The ISA 135 may then upgrade the main agent 145 (operation 250). This upgrade may include upgrading one or more processes 140 offloaded by the host server. These processes 140 recover their states from prior to the upgrade.

When the upgrade is complete, the main agent 145 again may notify the backup agent 160, for example, using another handshake. The backup agent 160 may then transfer the one or more critical duties back to the main agent 145 (operation 260). The backup agent 160 may shut down or be terminated once it finishes the execution. In some cases, the main agent 145 or the ISA may reclaim the core 155M used by the backup agent 160 in order to obtain additional processing power for implementing the one or more functions or processes 140.

An ISA with a single core may also be upgraded with the provided methods and systems. In such an embodiment, a main agent may be implemented within the ISA kernel. After the ISA kernel boots, it may set up its memory and enable one of its processor cores for the execution of program instructions. In this process, the main agent may be a module within the kernel. It may perform all upgrading operations as the kernel boots.

Figure 3:
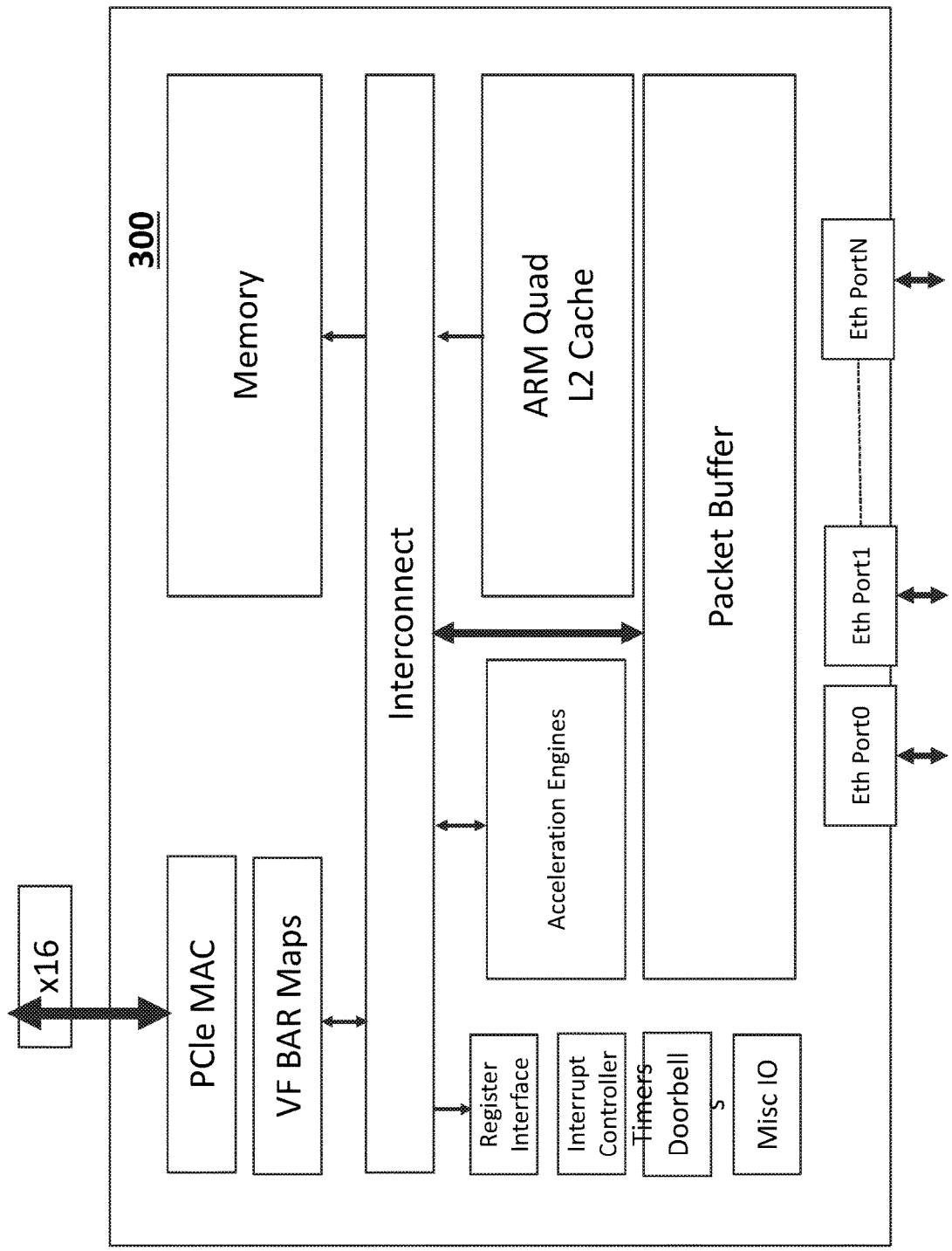
FIG. 3 shows an exemplary I/O device system with described programmable device interface, in accordance with some embodiments of the invention.

FIG. 3 shows an exemplary I/O device system 300 with described programmable device interface, in accordance with some embodiments of the invention. The I/O device system 300 may be the same as the intelligent server adapter (ISA) as described in FIG. 1. In some cases, the I/O device may be implemented as a rack mounted device and comprise one or more Application Specific Integrated Circuits (ASICS) and/or boards with components mounted thereon. The I/O device system 300 may comprise processors such as RISC machine (ARM) processors with coherent L2 cache. The processors (e.g., acceleration engines) can be used to implement functions or processes as described with respect to FIG. 1.

The I/O device system may comprise a host interface and a network interface. The host interface may be configured to provide communication link(s) with one or more hosts (e.g., host servers). The host interface may also observe regions of the address space via PCIe BAR maps to expose network functions to a host system. In an example, the address map may be initially created according to the principles of ARM memory maps, ARM limited, which provides SOC addressing guidelines for a 34-bit memory map.

The network interface may support network connections or uplinks with a computing network that may be, for example, a local area network, wide area network and various others as described elsewhere herein. The physical link may be controlled by the main agent (e.g., main agent 145) through the device driver.

The I/O device system may comprise programmable registers. These registers may comprise, for example, PCIe base address registers (BARs) that may include a memory BAR containing device resources (e.g., device command registers, doorbell registers, interrupt control registers, interrupt status registers, MSI-X interrupt table, MSI-X interrupt pending bit array, etc.) a BAR containing device doorbells pages, and a BAR for mapping a controller memory buffer.

Figure 4:
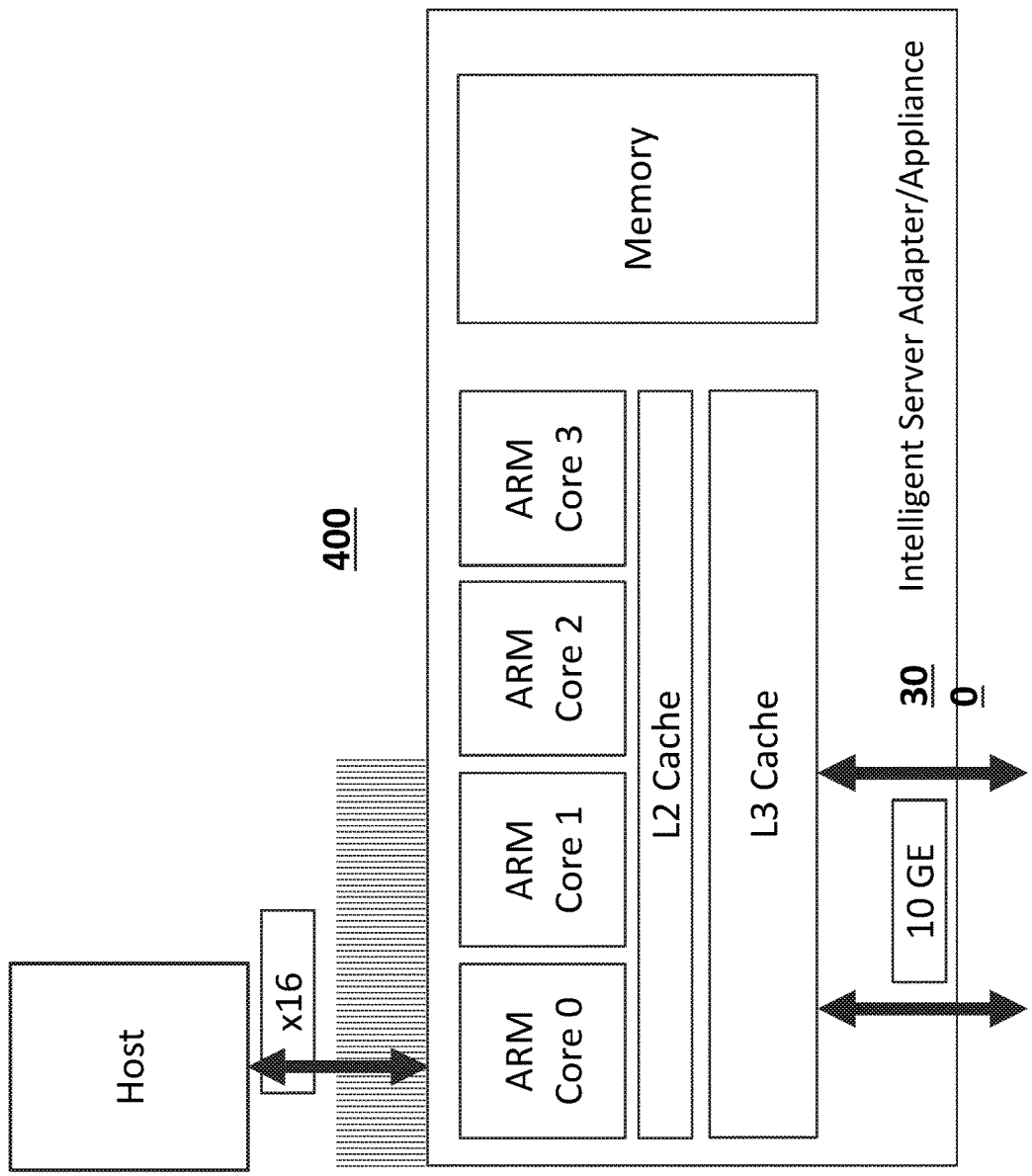
FIG. 4 schematically shows an example system comprising an I/O device in communication with a host system.

FIG. 4 schematically shows an example system 400 comprising an I/O device system 300 in communication with a host system. The I/O device system 300 as shown in FIG. 4 may comprise four advanced RISC machine (ARM) processors with coherent L2 and L3 caches, a shared local memory system, flash non-volatile memory, DMA engines, and miscellaneous I/O devices for operation and debug. The ARM processor may implement the main agent and backup agent as described elsewhere herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for upgrading an intelligent server adapter, the method comprising:
    a) receiving an upgrade request at a main agent of the intelligent server adapter, wherein the intelligent server adapter comprises a kernel, wherein the main agent includes a first set of instructions that are implemented by a first processor core connected to the kernel;
    b) in response to receiving the upgrade request, initiating a backup agent, wherein the backup agent includes a second set of instructions that are implemented by a second processor core connected to the kernel, wherein the second set of instructions includes a minimal set of functionalities of the kernel;
    c) transferring state information to the backup agent;
    d) disconnecting the second processor core from the kernel;
    e) performing an upgrade of one or more components of the intelligent server adapter; and
    f) restarting the main agent by retrieving, from the backup agent, the minimal set of functionalities of the kernel, wherein the minimal set of functionalities of the kernel are not executed by the disconnected second processor core after restarting the main agent.

2. The method of claim 1, wherein the main agent is within the kernel of the intelligent server adapter.

3. The method of claim 1, wherein the intelligent server adapter is a PCIe device.

4. The method of claim 1, wherein transferring the state information to the backup agent comprises performing a handshake.

5. The method of claim 1, further comprising terminating the backup agent upon completion of the upgrade.

6. The method of claim 5, further comprising reclaiming the second processor core.

7. The method of claim 1, wherein the main agent includes a Linux process.

8. The method of claim 1, wherein the second set of instructions includes one or more critical functions performed by the main agent.

9. The method of claim 8, comprising:
    after performing the upgrade, restarting the main agent by retrieving the critical functions from the backup agent, wherein the critical functions are not executed by the disconnected second processor core after restarting the main agent.

10. The method of claim 1, wherein the intelligent server adapter is coupled to a host system, and wherein a failure of the minimal set of functionalities of the kernel causes a reboot of the host system.

11. The method of claim 1, wherein the backup agent is implemented in a tight loop that does not share processing resources with other agent programs.

12. The method of claim 1, wherein after disconnecting the second processor core from the kernel, the second processor core is not communicatively coupled to the kernel.

13. An intelligent server adapter, communicatively coupled to a host computing system, comprising:
    a) a kernel;
    b) a first processor core connected to the kernel;
    c) a second processor core connected to the kernel;
    d) a main agent including a first set of instructions executable by the first processor core, wherein the first set of instructions includes a set of communication functionalities, the main agent configured to: (i) process requests from the host computing system; (ii) perform the set of communication functionalities; and (iii) during an upgrade process of the intelligent server adapter, initiate a backup agent and communicably decouple the second processor core from the kernel; and
    e) the backup agent including a second set of instructions executable by the second processor core, wherein the second set of instructions includes a subset of the set of communication functionalities performed by the main agent that comprise a minimal set of functionalities of the kernel, wherein upon completion of the upgrade process, the main agent is restarted by retrieving, from the backup agent, the minimal set of functionalities of the kernel from the backup agent, and wherein the minimal set of functionalities of the kernel is not executed by the communicably decoupled second processor core after restarting the main agent.

14. The intelligent server adapter of claim 13, wherein upon completion of the upgrade process, the main agent is restarted by retrieving the subset of the communication functionalities, wherein the subset of the communication functionalities is not executed by the communicably decoupled processor core after restarting the main agent.

15. The intelligent server adapter of claim 13, wherein the main agent is within the kernel of the intelligent server adapter.

16. The intelligent server adapter of claim 13, wherein the intelligent server adapter is a PCIe device.

17. The intelligent server adapter of claim 13, wherein the main agent is further configured to transfer state information to the backup agent.

18. The intelligent server adapter of claim 13, wherein the backup agent is terminated upon completion of the upgrade.

19. The intelligent server adapter of claim 13, wherein the processor core is reclaimed by the intelligent server adapter upon completion of the upgrade process.

20. The intelligent server adapter of claim 13, wherein the main agent includes a Linux process.

* * * * *